(12) United States Patent
Lebron et al.

(10) Patent No.: US 11,279,091 B2
(45) Date of Patent: Mar. 22, 2022

(54) DETERMINING DISTRIBUTION PATTERNS FOR OBJECT PORTIONS

(71) Applicant: HEWLETT-PACKARD DEVELOPMENT COMPANY, L.P., Houston, TX (US)

(72) Inventors: Hector Lebron, San Diego, CA (US); Jake Wright, San Diego, CA (US); Morgan T. Schramm, Vanvcouver, WA (US); Matthew A. Shepherd, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 708 days.

(21) Appl. No.: 16/075,706

(22) PCT Filed: Jul. 10, 2017

(86) PCT No.: PCT/US2017/041340
§ 371 (c)(1),
(2) Date: Aug. 6, 2018

(87) PCT Pub. No.: WO2019/013746
PCT Pub. Date: Jan. 17, 2019

(65) Prior Publication Data
US 2021/0060862 A1    Mar. 4, 2021

(51) Int. Cl.
*B29C 64/393* (2017.01)
*B33Y 10/00* (2015.01)
(Continued)

(52) U.S. Cl.
CPC ............ *B29C 64/393* (2017.08); *B22F 10/00* (2021.01); *B28B 1/001* (2013.01);
(Continued)

(58) Field of Classification Search
CPC ..... B29C 64/393; B29C 64/153; B33Y 10/00; B33Y 50/02; B22F 10/00; B22F 10/10; B28B 1/001; B29B 17/0081
See application file for complete search history.

(56) References Cited

U.S. PATENT DOCUMENTS

| 9,374,497 B2 | 6/2016 | Misfeldt et al. |
| 2013/0075957 A1 | 3/2013 | Swanson et al. |

(Continued)

FOREIGN PATENT DOCUMENTS

| CN | 203543128 U | 4/2014 |
| JP | 2000207527 A | 7/2000 |

(Continued)

OTHER PUBLICATIONS

Zeng et al., "Layer by Layer Validation of Geometrical Accuracy in Additive Manufacturing Processes", Retrieved from Internet: https://sffsymposium.engr.utexas.edu/Manuscripts/2013/2013-06-Zeng.pdf, 2013, 12 pages.

*Primary Examiner* — Larry W Thrower
(74) *Attorney, Agent, or Firm* — HP Inc. Patent Department

(57) ABSTRACT

In an example, a method includes forming a layer of build material, processing a first portion of the build material by distributing a print agent using a first distribution pattern, the first distribution pattern having a first print agent dispersion characteristic and processing a second portion of the build material by distributing a print agent using a second distribution pattern, the second distribution pattern having a second print agent dispersion characteristic. The method may further include heating the build material by exposing the layer of build material to radiation so as to cause fusing of the first and second portion.

8 Claims, 5 Drawing Sheets

(51) Int. Cl.
- *B33Y 50/02* (2015.01)
- *B29C 64/153* (2017.01)
- *B22F 10/00* (2021.01)
- *B28B 1/00* (2006.01)
- *B28B 17/00* (2006.01)
- *B22F 10/10* (2021.01)

(52) U.S. Cl.
CPC ........ *B28B 17/0081* (2013.01); *B29C 64/153* (2017.08); *B33Y 10/00* (2014.12); *B33Y 50/02* (2014.12); *B22F 10/10* (2021.01)

(56) References Cited

U.S. PATENT DOCUMENTS

| | | |
|---|---|---|
| 2016/0332329 A1 | 11/2016 | Nguyen et al. |
| 2017/0100210 A1 | 4/2017 | Wen |

FOREIGN PATENT DOCUMENTS

| | | |
|---|---|---|
| RU | 2397525 C2 | 8/2010 |
| WO | WO-2016057034 | 4/2016 |
| WO | 2016119883 A1 | 8/2016 |
| WO | 2016151612 A1 | 9/2016 |
| WO | WO-2016175813 A1 | 11/2016 |
| WO | 2017045541 A1 | 3/2017 |

DETERMINING DISTRIBUTION PATTERNS FOR OBJECT PORTIONS

BACKGROUND

Three-dimensional (3D) printing is an additive manufacturing process in which three-dimensional objects may be formed, for example, by the selective solidification of successive layers of a build material. The object to be formed may be described in a data model. Selective solidification may be achieved, for example, by fusing, binding, or solidification through processes including sintering, extrusion, and irradiation. The quality, appearance, strength, and functionality of objects produced by such systems can vary depending on the type of additive manufacturing technology used.

BRIEF DESCRIPTION OF DRAWINGS

Non-limiting examples will now be described with reference to the accompanying drawings, in which.

DETAILED DESCRIPTION

Additive manufacturing techniques may generate a three-dimensional object through the solidification of a build material. In some examples, the build material may be a powder-like granular material, which may for example be a plastic, ceramic or metal powder. The properties of generated objects may depend on the type of build material and the type of solidification mechanism used. Build material may be deposited, for example on a print bed and processed layer by layer, for example within a fabrication chamber.

In some examples, selective solidification is achieved through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material coalesces and solidifies to form a slice of the three-dimensional object in accordance with the pattern. In other examples, coalescence may be achieved in some other manner.

Another example of a print agent is a coalescence modifying agent (which may also be referred to as a modifying or detailing agent), which acts to modify the effects of a fusing agent and/or energy applied for example by inhibiting, reducing or increasing coalescence and/or to assist in producing a particular finish or appearance to an object. A property modification agent, for example comprising a dye, colorant, a conductive agent, an agent to provide transparency or elasticity or the like, may in some examples be used as a fusing agent or a modifying agent, and/or as a print agent to provide a particular property for the object Additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices in parallel planes of the model. Each slice may define a portion of a respective layer of build material that is to be solidified or caused to coalesce by the additive manufacturing system.

Figure 1:
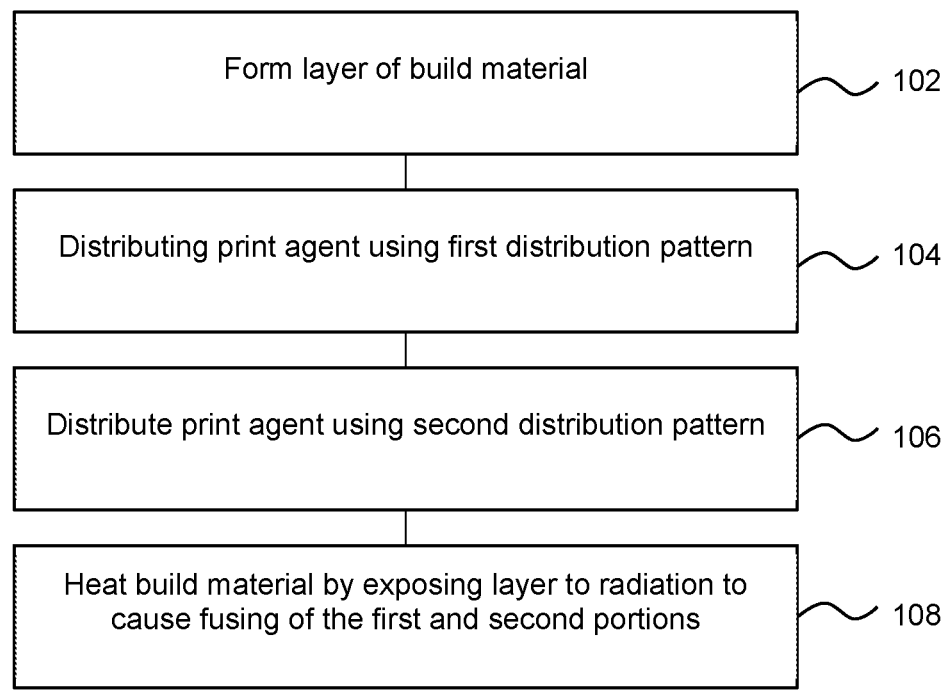
FIG. 1 is an example of a method of generating an object using additive manufacturing.

FIG. 1 shows an example of a method of generating an object using additive manufacturing in which print agent is dispersed according to distribution patterns. The distribution patterns may in some examples comprise 'micro-patterns' which are below the normal visual perception of the human eye, and in which the dispersion characteristics of the application at least one print agent may be controlled. Different print agent distribution patterns may have different print agent dispersion characteristics, for example, different clustering in the applied print agent. For example, the size (volume) and/or separation of cluster elements (i.e. 'dots' of print agent, for example fired from an inkjet style print agent distributor) and/or the size and separation of clusters of print agent elements may differ between distribution patterns.

Distribution patterns may have an effect on appearance properties (for example, as further set out below, some distribution patterns may affect the brightness of colors) and mechanical and/or functional properties (for example, some distribution patterns may result in a stronger or less brittle object than other distribution patterns).

Block 102 comprises forming a layer of build material. For example, the layer of build material may be formed of a granular material, such as a granular plastic material, for example using a roller and/or spreader or the like.

Block 104 comprises processing a first portion of the build material by distributing a print agent using a first distribution pattern having a first print agent dispersion characteristic and block 106 comprises distributing a print agent using a second distribution pattern having a second print agent dispersion characteristic.

In some examples, these blocks may be carried out in the opposite order, or in an overlapping timeframe. For example, a printhead may be scanned over the surface of a layer of build material, and depending on the location of the print head above the layer, it will dispense print agent according to the first and second distribution pattern, in some examples switching between the two on multiple occasions. In some example, distributing a print agent is carried out using a print agent distributor, for example a print head which may dispense print agent using 'inkjet' techniques or the like, and which may for example move relative to the layer of print agent, and may perform at least one printing pass of the layer of build material.

In some examples, one of the distribution patterns may comprise a print agent dispersion characteristic specifying a regular dispersion, without significant clusters and voids between clusters where few print agent dots are applied, whereas another of the distribution patterns may comprise having a print agent dispersion characteristic specifying that clusters of print agent dots are applied to a layer in close proximity with one another and there are voids between the clusters (i.e. portions of the build material which is left at least substantially clear of print agent dots). The separation of the clusters may be controlled to provide a particular distribution pattern.

It may be noted that, in addition, there may be a print agent pattern related the shape of the slice of the object to be formed in that layer of build material (e.g. a fusing agent may be dispensed in one region of build material which is intended to fuse to form the object, and not in another, which is not intended to form part of an object). The print agent distribution pattern relates to how the print agent is dispersed within such an object slice pattern.

Block 108 comprises heating the build material by exposing the layer of build material to radiation so as to cause fusing of the first and second portion. For example, this may comprise exposing the layer to a heat source such as a heat lamp. In some examples, heating is carried out at least partially concurrently with print agent distribution (for example, a print agent distributor may comprise, or be in close proximity to, a heat source).

As mentioned above, the first and second distribution patterns may be associated with a print agent dispersion characteristic relating to a particular cluster element size, cluster size and/or cluster separation of the distributed print agent, and or with a 'blanket' or an unstructured, substantially continuous distribution.

Figures 2A, 2B, 2C:
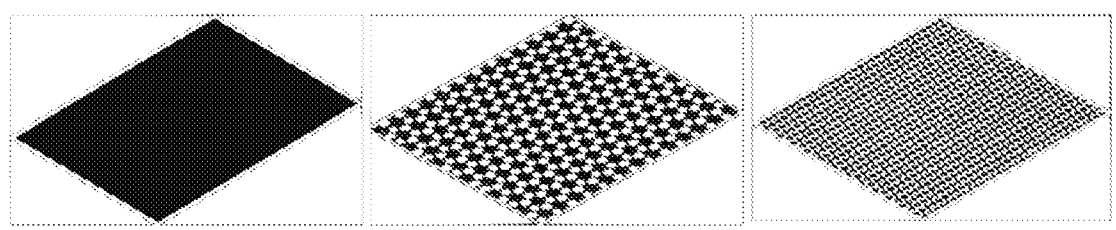
FIGS. 2A, 2B and 2C show different example print agent distribution patterns.

FIG. 2A shows 'blanket' or even distribution of print agent: the print agent dots are applied so as be approximately evenly dispersed, i.e. each dot is around the same distance from its nearest neighbour in each direction. FIG. 2B shows a distribution having a first cluster size and cluster separation and FIG. 2C shows a second cluster size and cluster separation. FIGS. 2B and 2C have roughly the same coverage (for example, both patterns may, on average, have X dots of print agent applied thereto), but in FIG. 2B, the clusters formed are larger and therefore more separated. Each cluster may comprise at least one print agent dot, or cluster element. In some examples, each cluster may in practice be made up of a number or cluster elements, or dots, which are not distinguishable in the Figure.

In both FIGS. 2A and 2C, when compared to FIG. 2A, the distance of the nearest neighbouring dots of a particular print agent dot may vary: for example, for a dot on the edge of a cluster, the nearest neighbour to one side may be close, being in the same cluster, but the nearest neighbour to the other side may be relatively distant, being separated therefrom by a void.

For example, the clusters within distribution patterns may vary in size between around 20 µm and 500 µm in diameter, between around 20 µm and 300 µm or between around 40 µm and 170 µm in diameter. Dots, or cluster elements, may be around 10-50 µm in diameter. The size of the dots or cluster elements (i.e. the cluster element diameter) may also vary between patterns.

When heat is applied to the object layer, the build material in the voids may at least partially fuse as a result of heat transfer from adjacent areas. However, in some examples, as is set out below, it may remain partially unfused, which may contribute to properties such as the brightness of a color.

In the example of FIG. 1, there are two portions of a layer of build material, each of which receives print agent according to a different distribution pattern. However in another example, there may be further portions which may receive print agents according to a different selected distribution pattern. For example, the method may comprise processing a third portion of the build material by distributing a print agent using a third distribution pattern having a third print agent dispersion characteristic. In some examples, the portions may be nested portions, with one portion being formed at least partially within another. The nesting of the portions may be complete or partial (i.e. a peripheral portion may extend around the entire perimeter of a core portion or an inner peripheral portion, or around just a portion of the perimeter). In some examples, peripheral portion(s) may form shell(s) around a core portion.

Figure 3A:
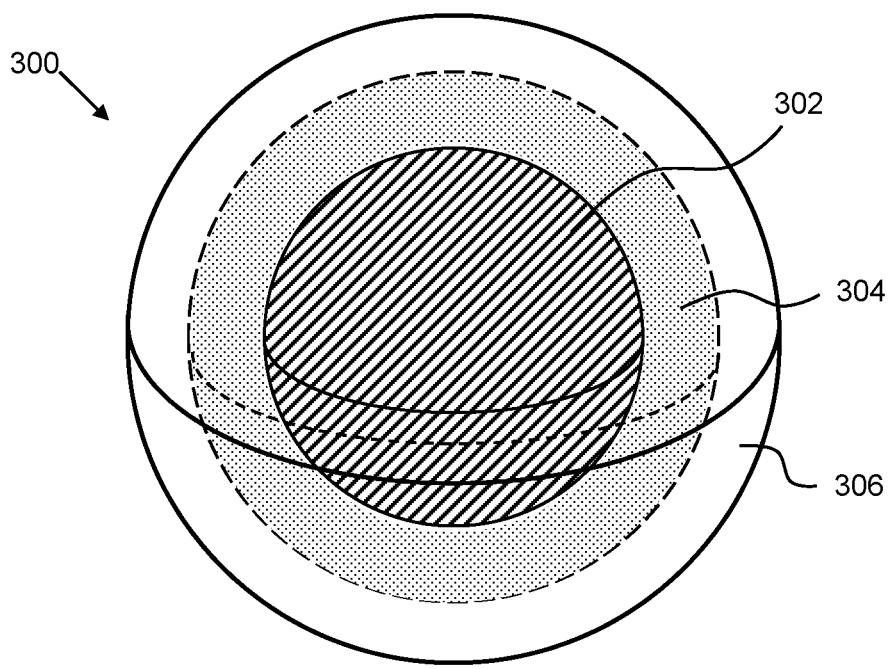
FIGS. 3A and 3B show examples of segmented objects.

FIG. 3A shows an example of a representation of a 3-dimensional object 300, in this example a sphere, formed into portions. In this example, there is a core portion 302 surrounded by two concentric shell-like portions 304, 306. For the purpose of discussion, the object 300 may be considered to be represented in a manner similar to a 'geological model', having a core (core portion 302), a mantel (inner shell portion 304) and a crust (outer shell portion 306).

Although in this example, the core portion 302 (i.e. a non-hollow portion) is substantially central with in the object 300, this need not be the case in all examples. In addition, while the portions 304, 306 in this example are concentric and the boundaries thereof follow the contours of the surface of the object 300, they need not be in all examples. Indeed in some examples, there may be a plurality of object core portions 302 around which portions 304, 306 are formed. The portions may be irregular, varying in width and shape, in some examples independently of the shape of the object.

Figure 3B:
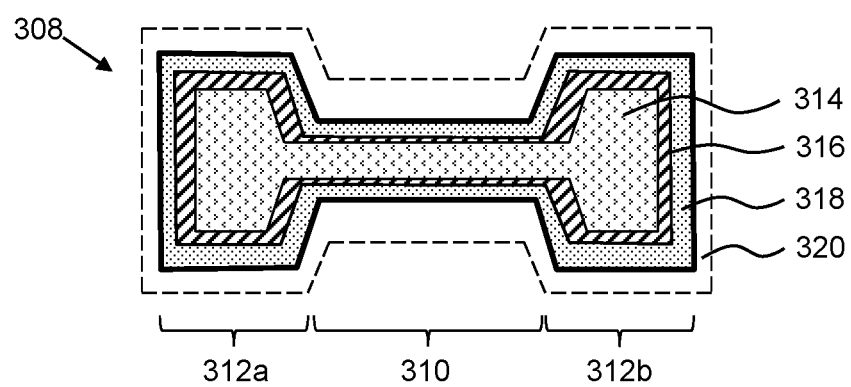

FIG. 3B shows a representation of a slice 308 of an object to be generated. In this example, the object comprises an elongate structure with a narrow central section 310 and two wider end sections 312a, 312b. In this example, a core portion 314 and two concentric outer portions 316, 318 extends to either end of the object via the central section 310.

The processed core portion 314, first portion 316 and second portion 318 (and any additional portions) may form, respectively, parts of a first and second and third structure of a multi-structured 3D object, and be formed using selected distribution patterns with print agent dispersion characteristics which may differ between portions 314, 316, 318. For example, print agent may be applied with the uniform dispersion of FIG. 2A to the core 314, print agent may be applied with the clustering as shown in FIG. 2B to the first portion 316 and print agent may be applied with the clustering as shown in FIG. 2C to the second portion 318.

In this example, there is a further portion 320 formed outside the object. To continue the example of a geological model above, this portion 320 may be thought of as comprising the 'atmosphere' of the object, and fusing agent may be applied thereto. The distribution pattern of the fusing agent may also be determined according to intended behaviours, for example the intended appearance properties.

Where slices of the object are formed into portions, this may be carried out independently for different slices. For example, a core portions in one slice may be aligned with, partially aligned with, or non-overlapping to a core portion in a previous or subsequent slice. Different slices may have differing numbers of portions.

Differentiation between nested object portions when determining object generation control instructions may have a number of uses in additive manufacturing. For example, when printing 3D color objects, there may be trade-offs between the intended color of the object and the mechanical properties of the objects. Higher density 3D objects that have significant mechanical strength and functionality can be produced when a greater amount of thermal energy is applied to the build material for fusing the layers together. The amount of thermal energy available for fusing depends in part on the intensity with which the fusing agent absorbs the radiation, and the radiation absorptivity of the fusing agent depends in part on the color of the fusing agent. For example, the absorption intensity of near-infrared dye-based fusing agent with cyan, magenta, or yellow (C, M, or Y) color dye is generally lower than that of, for example, carbon black-based fusing agent which is an effective absorber of energy. However, adding large amounts of fusing agent may darken the color (in the case of carbon black) or increase costs (in some examples of low-tint fusing agent). Therefore, the level of fusing of the build material may be lower for 3D printed color objects than it is for similarly produced 3D printed black objects, which results in color objects having lower densities and less mechanical strength and functionality than comparable black objects.

Thus, in some examples, a colored portion could be determined about a core portion which is fused using carbon black, such that the core may provide the object strength and the colored outer portion provides the intended appearance. However, the color gamut of resulting object may be reduced by the surface visibility of the underlying core portion (which may be particular the case for partially transparent outer layers). Providing at least one intermediate portion may allow for a more gradual transition of properties (e.g. from black to colorful).

While the example of color has been used here, the same is true for other properties: for example, an object may be generated comprise a core which is relatively strong but may be relatively brittle: over lying shells of increasing reliance towards the surface may protect the core from shattering more effectively than a single resilient portion surrounding the core by absorbing energy while giving an intended surface resilience. The resilience of such shells could therefore be determined on a portion-by-portion basis.

In addition to choices such as a type or an amount of print agent which may be applied, and other instructions such as the heat levels used during object generation, another aspect of the object generation control instructions which may be determined is the choice of distribution pattern.

Figure 4A:
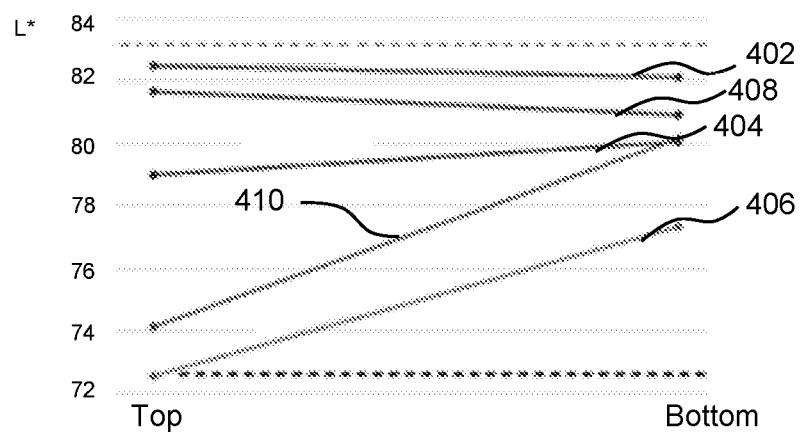
FIGS. 4A and 4B show examples of how lightness may vary with distribution pattern.
Figure 4B:
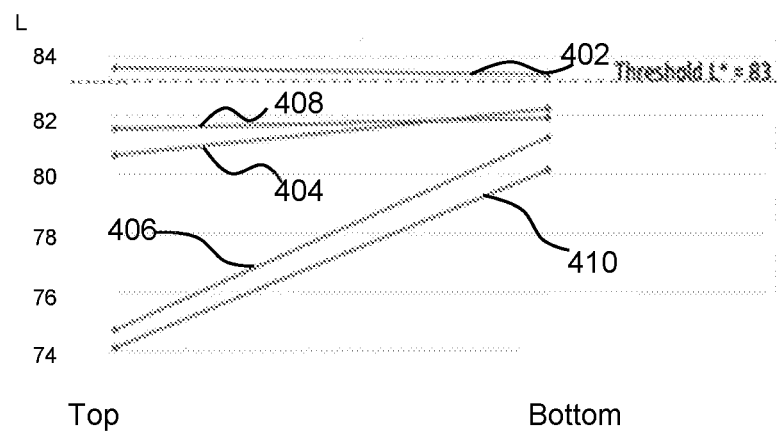

Different distribution patterns provide different effects, as is now discussed in relation to FIG. 4A and FIG. 4B. FIGS. 4A and 4B represent the performance for different distribution patterns used to generate objects in the 'Lab' color space, which describes colors in three dimensions: L evaluates lightness, while a and b evaluate color: 'a' for a green-red axis and 'b' for a blue-yellow axis. A high L may be sought as it is associated with vibrant colors. The lines shown link an average top L value and an average bottom L values for a lower face of the object and an upper face of the object. Due to the nature of additive manufacturing techniques, there may be differences in appearance of these faces. In some examples, graphs with a relatively shallow slope may be sought as it suggests greater color consistency may be achieved over an object, i.e. faces may appear similar to one another.

FIG. 4A considers an object in which the first portion is an outer shell portion of the object formed about a core. The shell has a first thickness, which is consistent over the object. In this example, a 'low-tint' fusing agent was applied to the outer shell at a given coverage (which may be specified as a percentage, e.g., 4% of the surface area of the shell in a layer, and/or with a given concentration), the low-tint fusing agent example comprising a Caesium Tungsten Bronze, or a Caesium Tungsten oxide composition, which are paler in color than carbon black fusing agents, but with a varying print agent distribution pattern. Line 402 shows the lightness of an object generated by applying print agents with clusters made up of cluster elements (i.e. print agent dot) of diameter 2*d1 with a cluster center-to-center spacing of 8*d1 (where d1 is may be on the order of $\frac{1}{1200}^{th}$ of an inch, or may be configured to provide a print resolution of at least 700 dots per inch (dpi), and in some examples at least 1000 dpi). The clusters may for example be around 40 μm in diameter. Line 404 shows the lightness when an object was formed with a cluster element size of diameter 2*d1 and a cluster center-to-center spacing of 4*d1, line 406 shows the lightness for an object formed by printing cluster elements with diameter 2*d1 and a center-to-center spacing of 4*d1 and line 408 shows the lightness for an object was formed by printing clusters with diameter d1 (i.e. a smaller dot) and a center-to-center spacing of 4*d1. Line 410 shows 'control' data, using a blanket coverage of print agent (i.e. having a regular distribution). As can be seen by comparing lines 404 and 406 to line 402, as the cluster separation decreases, the slope increases and the overall lightness reduces. This may be because the distribution pattern becomes closer to the equivalent of a 'blanket' fusing agent layer. Without being bound by theory, this may be because more of the build material, which in the case is a plastic powder which appears white when unfused, remains, contributing to the brightness of the object.

Both lines 402 and 408 represent printed patterns having relatively large voids relative to the dot size when compared to the other distribution patterns (i.e. as defined above, for 402 a cluster separation of 8*d1 rather than 2*d1 or 4*d1), and exhibit reasonable flatness with a relatively high level of lightness.

In this example, the core is printed with a blanket coverage of carbon black based fusing agent.

FIG. 4B shows a similar behaviour, but in this case the same micro patterning was applied over a greater thickness of the object (i.e. to a greater depth below the surface)—in other words, the shell has a second thickness which is greater than the first thickness, the core again being printed with a blanket coverage of fusing agent. Otherwise, the lines represent the clustering behaviour as set out above. It may be noted that in this case, the data relating to line 402 (i.e. relating to the clusters have a diameter of center-to-center spacing of 8*d1) indicates that the brightness of the object exceeds the threshold level, resulting in the production of a highly colorful object.

Figure 5:
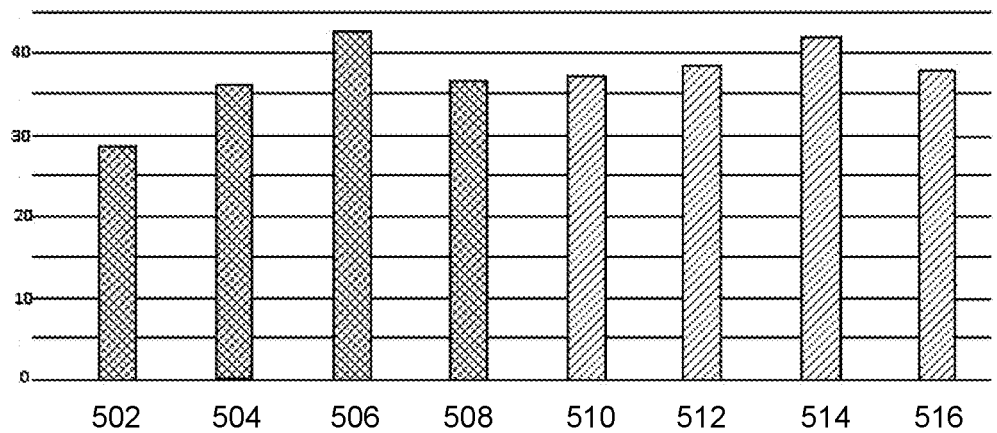
FIG. 5 shows an example of how strength may vary with distribution pattern.

FIG. 5 shows the ultimate tensile strength in mega-Pascals (MPa) for test parts corresponding to those of FIGS. 4A and 4B. Bars 502-508 relate to micro patterns of a test object made with fusing agent applied to the second, thicker, shell thickness (i.e. the thickness modelled in FIG. 4B) and bars 510-516 relate to micro patterns applied to the first, thinner, shell thickness (i.e. the thickness modelled FIG. 4A). Bars 502 and 510 show a strength for a test object printed with cluster element size of 2*d1 and a separation of 8*d1, bars 504 and 512 show a strength for a test object printed with a cluster element size of 2*d1 and a separation of 6*d1, bars 508 and 516 shows a strength for a part printed with a cluster element size of 2*d1 and a separation of 6*d2 and bars 508 and 516 shows a strength for a part printed with a cluster element size of d1 and a separation of 4*d1.

As can be seen from the trend for 502 to 506 and 510 to 514, as the print agent pattern becomes tighter, the strength generally increases. As can be seen from bar 502, printing a sparse micro pattern of print agent to a significant depth reduces the strength of the test object considerably.

Thus, both the choice of the pattern and the extent of the region to which it is applied may be selected in order to achieve a particular object property.

While some distances and dimensions have been specified herein, these are purely by way of example. In some examples, the clusters may be 84 µm to 170 µm in diameter/center-to-center spacing. In some examples, the center-to-center cluster spacing may be less than 500 µm, or less than 300 µm, or less than 200 µm. As noted above, the spacing may be below a visibility/perception threshold for a human eye.

In summary therefore, while printing in separated clusters may result in bright colors, this may compromise other properties such as the strength of the object. By using different print agent distribution patterns for different portions of the object, a trade-off may be improved. For example, in the centre of an object, a blanket or uniform print agent application may be used to provide strength and structural integrity, whereas a clustered pattern including voids may be used in an outer region, to a depth which may be specified to achieve a particular intended colorfulness. In some examples, an outer region (e.g. a surface shell) may comprise clusters with relatively large separations and an intermediate region (e.g. a sub-surface shell) may comprise clusters with smaller separations, providing some color benefits to the outer region (for example, improving a brightness or hue gamut of the outer region) while also being relatively strong compared to such brighter outer layers. Other properties such as ductility (part elongation at break) strength, and surface roughness may also be affected by the choice of distribution pattern.

Therefore, in some examples, a first distribution pattern is denser, or more uniform, (e.g. comprises smaller voids) than a second distribution pattern and the first portion is within (i.e. further from object surface) the second portion.

Determining which distribution pattern to select for a given object portion may be based on object geometry (i.e. the distribution pattern selection may be a function of object geometry, and in some examples, local object geometry) and may comprise determining a local feature size, or the cross sectional area of the object at a location, as if further set out below. In another example, determining the pattern to select may be based on the location of a region within an object, with inner regions being treated differently to outer regions. In some examples, the different distributions patterns may be determined to provide an intended property gradient and/or a quality specification. In some examples, the distribution pattern selection may be a function of a property stated for the object and in some examples, a local object property. For example, it may be determined that an outer portion is to be more sparsely patterned (i.e. having larger voids) when a color quality specification is high and/or when a color specified for the portion is a light color than when the colour quality specification is low and/or the target color is dark. In another example, a distribution pattern for a portion may be determined so as to provide a threshold parameter in a particular first property (e.g. strength) and the distribution pattern(s) for remaining portion(s) may be determined so as to, for example, optimise a second property (e.g. colorfulness) given the constraint to the first parameter.

The portions may be determined for an object as a whole or may be determined for a 'slice' of the object which may correspond to a layer of the object to be generated in a layer-by-layer additive manufacturing process.

Other aspects of print agent application may be selected on a portion by portion basis, for example a coverage of a print agent, or a choice of a print agent (for example, a low-tint fusing agent which may allow a more colorful object to be formed over a dark print agent, such as a print agent comprising carbon black components, which may be a more efficient thermal absorber). In some examples, such aspects may vary within a portion.

In some examples, the distribution pattern may be selected so as to set graduations in a change in a characteristic.

In some examples, a lower-tint fusing agent may be used in place of carbon black, which may increase a gamut of colors available for an object. However, where such an alternative fusing agent is a less efficient thermal absorber, less readily available and/or more expensive (either in itself or in that more agent or energy may be applied to allow fusing temperatures to be reached), it use may be controlled, such that it is used in just those circumstances where it provides a particular benefit such as colorfulness. For example, its use may be constrained to the outer segment(s) in which the colorfulness can be seen.

In some examples, therefore, providing different distribution patterns for the different portions allows for processing of each portion to provide different characteristics: for example, a core may be patterned to provide high density and high mechanical strength, and may be surrounded by an external shell structure which is patterned in a manner which provides a lower strength but high quality vivid color. At least one intervening portion may obscure or reduce the effect of a dark core on such a vivid outer segment. In addition to a selection of a print agent distribution pattern, each portion within an object (or parts of each portion) can be processed using different 3D print processing parameters (including for example, print agent coverage levels, print agent selection and the like) chosen to achieve intended characteristics for that portion.

In some examples, as mentioned above, the distribution pattern selected may depend on the local part geometry. For example, for smaller features of the object (for example, points, extensions, detailed or convoluted regions), there may be two regions, which may be relatively densely covered whereas with larger features of the object there may be more regions, and a greater variability in the clustering/dot size from blanket coverage to large, well separated clusters. The visual specifications for color may differ over an object: portions of the object which are unlikely to be visible in normal use, or which are relatively small or geometrically complex (the human eye being relatively less sensitive to color variations over such areas) may in some examples be printed with a lower quality standard applied to color without unduly sacrificing the color quality of the object as a whole. In another example, the bottom section of an object may have different dimensional tolerances or strength properties than the top of a part, and therefore a distribution pattern in such a region may be selected accordingly. A volume of an object portion to which a blanket coverage is applied may be increased in such an object section. As the strength of a very fine feature is normally weaker than parts with a larger cross-section, any object portion to which a blanket coverage is applied (for example, a core) may for example constitute a relatively large proportion of a densely patterned, or blanket coverage cross-sectional area of the object at such a point (which may for example sacrifice colorfulness, although as noted above, this may be less visually impactful for smaller areas).

In some examples, there may be first, second and third object portions, wherein the first section is formed at least partially within the second portion, which is in turn formed at least partially within the third portion. In such an example, the first portion may be printed with a print agent according to a substantially continuous coverage, the second portion may be printed with a pattern having print agent clusters of a first separation and the third portion may be printed with a pattern having print agent clusters of a second separation. In some examples, the size of continuous portions of build material to which print agent is not applied (i.e. voids between clusters) may increase towards the outer portions. In some examples, the size of a cluster and/or cluster element may also vary between portions.

Figure 6:
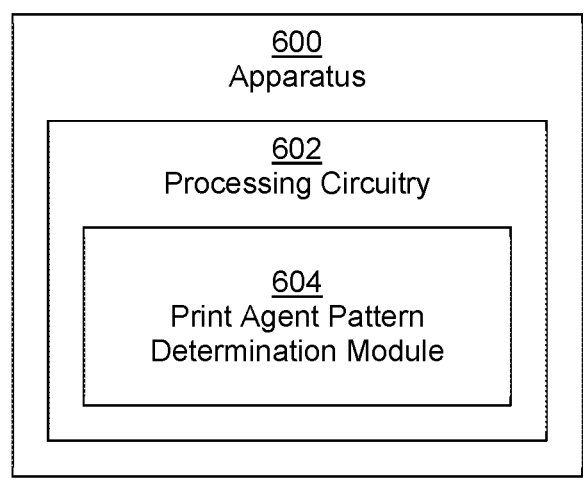
FIGS. 6 and 7 are examples of apparatus for processing data relating to additive manufacturing.

FIG. 6 is an example of an apparatus 600 comprising processing circuitry 602, the processing circuitry 602 comprising a print agent distribution pattern determination module 604. The print agent distribution pattern determination module 604, in use of the apparatus, determines a distribution pattern for a print agent in object generation, the distribution pattern for an object portion having a print agent dispersion characteristic and being determined based on at least one of a distance of the object portion from an object surface, an object geometry and an intended object property. The determination may comprise selecting a defined pattern from a set of distribution patterns, and/or may comprise determining a pattern having particular clustering behaviour, for example based on an algorithm.

For example, the determination may be made based on a data model of an object to be generated in additive manufacturing. Such data may for example be stored in or received from a memory, received over a network, received over a communications link or the like. In some examples, such a data model may for example comprise object model data and object property data. The model data may define a three-dimensional geometric model of at least a portion of the model object, including the shape and extent of all or part of an object in a three-dimensional co-ordinate system, e.g. the solid portions of the object. In some examples, the data model may represent the surfaces of the object, for example as a mesh. The object model data may for example be generated by a computer aided design (CAD) application. Object property data may define at least one object property for the three-dimensional object to be generated. In one example, the object property data may comprise any or any combination of a color, flexibility, elasticity, rigidity, surface roughness, porosity, inter-layer strength, density, transparency, conductivity and the like for at least a portion of the object to be generated. The object property data may define multiple object properties for a portion or portions of an object. If no object property data is present the object may have some default properties based on the build material and print agents used.

In some examples, the print agent distribution pattern determination module 604 is to determine the distribution pattern for an object portion based on a size of an object feature comprising the object portion. For example, as discussed above, a relatively small object feature may comprise a relatively large portion of dense or substantially continuous distribution pattern. In other examples, the print agent distribution pattern determination module 604 is to determine the distribution pattern for an object portion based an object property associated with the object portion, for example to provide a threshold strength, colorfulness, resilient, conductivity or the like. In some examples, the pattern is determined by selecting at least one of (i) a cluster element size, (ii) a cluster size/separation, (iii) a density of the pattern. As noted above, these properties may impact the strength or other properties of the object formed. In some examples, the print agent distribution pattern determination module 604 is to determine a plurality of agent application distribution patterns for an object layer (i.e. a layer formed in layer-by-layer additive manufacturing processes). For example, the print agent distribution pattern determination module 604 may determine different distribution patterns for each of a plurality of object portions, which may be at least partially nested within one another.

Figure 7:
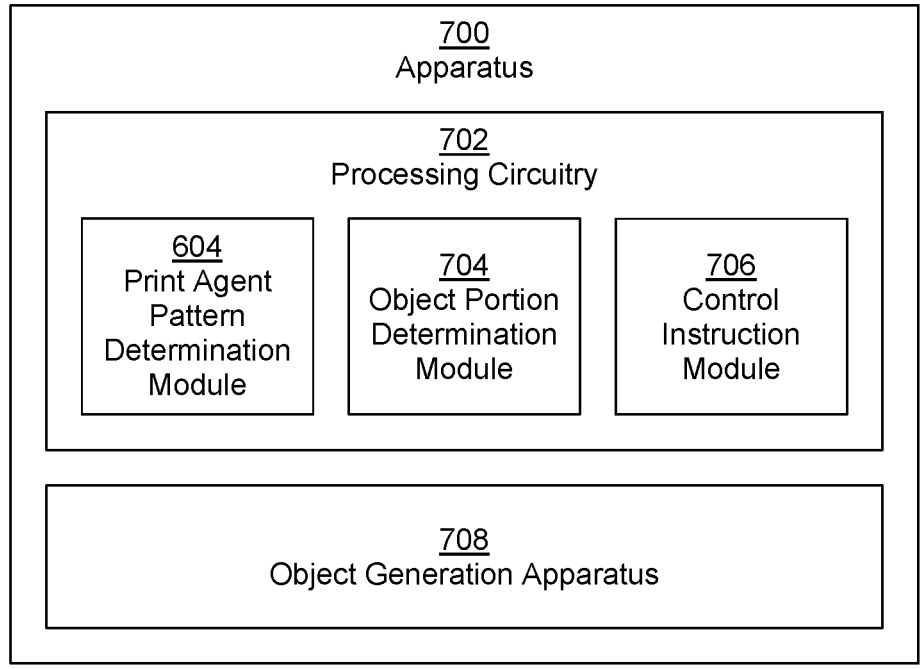

FIG. 7 shows an example of an apparatus 700 comprising processing circuitry 702 which comprises the print agent distribution pattern determination module 604 as well as an object portion determination module 704 and a control instruction module 706. The apparatus 700 further comprises an object generation apparatus 708.

In use of the apparatus 700, the object portion determination module 704 segments a data model of the object into a plurality of object portions based on at least one of a size of an object feature comprising the portions and an object property associated with the portions, and the print agent distribution pattern determination module 604 determines a print agent distribution pattern for each of the portions. For example, these may comprise nested portions as shown in FIGS. 2A and 2B.

In some examples, the object portion determination module 704 may segment a virtual build volume comprising at least a portion of the object into a plurality of nested object portions comprising a core portions and at least one peripheral portions. Determining the portions may comprise determining the extent of the peripheral portions(s) and/or the overall number of portions.

The virtual build volume may for example comprise a boundary box enclosing the object, may be the size and shape of the object (i.e. follow the surfaces of the object), and/or represent at least part of a build volume in which the object is to be fabricated. In some examples, the virtual build volume may comprise one or more 'slices', each of which may represent a layer of the object to be fabricated in layer-by-layer additive manufacturing of the object.

In some examples, there may be a plurality of nested peripheral portions. Such portions may be peripheral to an inner peripheral portions or to a core.

The nesting of the portions may be complete or partial (i.e. a peripheral portions may extend around the entire perimeter of the core portions or an inner peripheral portions, or around just part of the perimeter). In some examples, peripheral portions may form shells around a core portions.

In use of the apparatus 700, the control instruction module 706 generates control instructions for generating an object using the print agent distribution pattern for the object portions. In some examples, the generation of control instructions uses different processing parameters for different portions. For example, the additive manufacturing control instructions for each portion may be generated using different processing parameters, and determining the instructions may for example comprise determining if a selection of at least one fusing agent is allowed, where the available fusing agent and/or the amount to be applied, which parameters may for example be different between the segmented portions. The processing parameters for an inner portion may for example allow selection of a 'carbon black' fusing agent (in some examples in combination with a lower-tint fusing agent), whereas surface portion may allow selection of a lower-tint fusing agent and not carbon black fusing agent. An outer portion may allow selection of colorants to give access to a larger color gamut than an interior segmented portion. In some examples therefore, the processing parameters may specify accessible print agents, print agent combination(s), and/or print agent amounts which may differ between object portions. In some examples, the processing parameters may be held in the form of a mapping resource such as a look-up table or mapping algorithm used to identity print agent amounts and/or combinations to apply to an object region corresponding to a particular object portion, with different mapping resources being associated with different segmented portion.

The object generation apparatus 708 is to generate the object according to the control instructions, and may to that end comprise additional components such as a print bed, build material applicator(s), print agent applicator(s), heat source(s) and the like, not described in detail herein.

Figure 8:
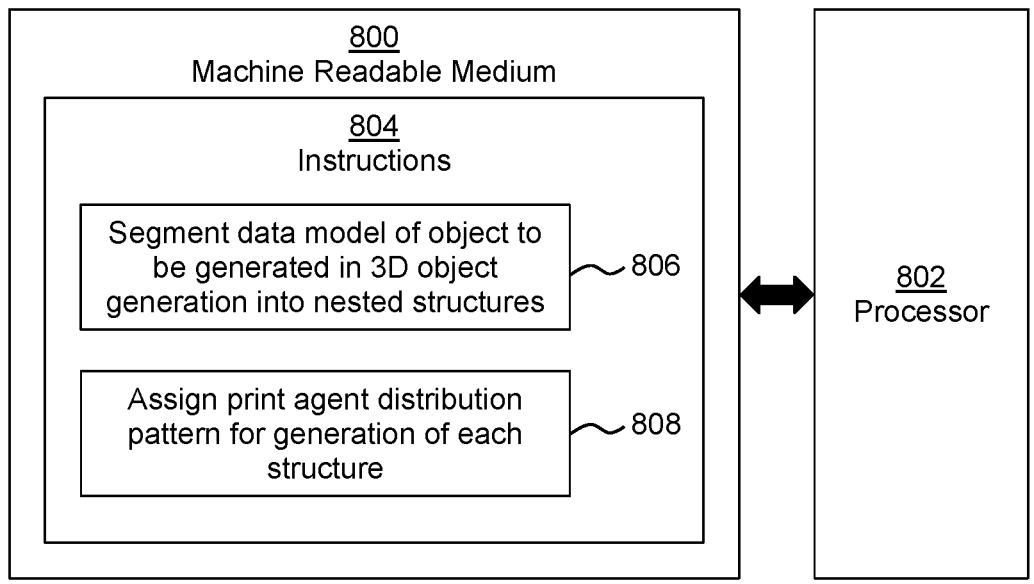
FIG. 8 is an example of a machine readable medium in association with a processor.

FIG. 8 is an example of a tangible machine readable medium 800 in association with a processor 802. The machine readable medium 800 stores instructions 804 which, when executed by the processor 802, cause the processor 802 to carry out processes. The instructions 804 comprise instructions 806 to segment at least a portion (e.g. a slice) of a data model of an object to be generated in three-dimensional object generation into a plurality of nested structures. The instructions 804 further comprise instructions 808 to assign a print agent distribution pattern having a print agent dispersion characteristic for generation of each structure. For example, the structures may comprise nested portions, as shown in FIGS. 3A and 3B.

In some examples, the instructions 804 may comprise instructions to cause the processor 802 to assign the print agent distribution patterns based a depth of a structure within the object (i.e. a distance from the object surface) and a density of the distribution pattern, such that denser distribution patterns (or those with smaller voids, or without voids) are associated with deeper structures than with structures closer to the surface of an object.

In some examples, the instructions 804 may comprise instructions to cause the processor 802 to determine control instructions for generating an object by applying a first set of processing parameters to a first structure and a second set of processing parameters to a second structure.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that various blocks in the flow charts and block diagrams, as well as combinations thereof, can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices (such as the print agent distribution pattern determination module 604, object portion determination module 704 and control instruction module 706) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. An apparatus comprising:
a processing circuitry; and
a memory storing instructions that when executed cause the processing circuitry to:
determine a print agent distribution pattern having a print agent dispersion characteristic for a print agent to be distributed onto a region of a build material layer for building an object portion of an object, the print agent distribution pattern being determined based on a distance of the object portion from a surface of the object; and
distribute the print agent onto the region of the build material layer according to the print agent distribution pattern.

2. An apparatus according to claim 1, wherein the instructions are executable to cause the processing circuitry to determine the print agent distribution pattern further based on a size of an object feature comprising the object portion.

3. An apparatus according to claim 1, wherein the instructions are executable to cause the processing circuitry to determine the print agent distribution pattern further based a color associated with the object portion.

4. An apparatus according to claim 1, wherein the instructions are executable to cause the processing circuitry to determine the print agent distribution pattern by selecting a print agent dispersion characteristic comprising at least one of:
   a cluster element diameter of the print agent distribution pattern,
   a cluster size and separation of the print agent distribution pattern, and
   a density of the print agent distribution pattern.

5. An apparatus according to claim 1, wherein the instructions are executable to cause the processing circuitry to determine a plurality of agent application distribution patterns having different print agent dispersion characteristics for the build material layer.

6. An apparatus according to claim 1, wherein the instructions are executable to cause the processing circuitry to segment a data model of the object into a plurality of object portions based on at least one of a size of an object feature comprising the object portions and an object property associated with the object portions, and determine a specific print agent distribution pattern for each of the object portions.

7. An apparatus according to claim 1, wherein the instructions are executable to cause the processing circuitry to generate control instructions for generating the object using the print agent distribution pattern for the object portion.

8. An apparatus according to claim 7, wherein the instructions are executable to cause the processing circuitry to generate the object according to the control instructions.

\* \* \* \* \*